Dec. 10, 1968    E. PELITTI    3,415,629
APPARATUS FOR THE PRODUCTION OF PHOSPHORIC ACID
Filed Jan. 21, 1966

INVENTOR
ENRICO PELITTI,
BY Yungblut, Melville, Strasser and Foster
ATTORNEYS 3,415,629
APPARATUS FOR THE PRODUCTION OF
PHOSPHORIC ACID
Enrico Pelitti, Cincinnati, Ohio, assignor to The Chemical
and Industrial Corp., Cincinnati, Ohio, a corporation of
Ohio
Filed Jan. 21, 1966, Ser. No. 522,249
8 Claims. (Cl. 23—285)

ABSTRACT OF THE DISCLOSURE

A single compartment reactor for production of phosphoric acid from phosphate-containing rock and sulfuric acid, having a straight vertical wall disposed centrally in the reactor in spaced relation to the outer walls, a partial baffle positioned between the vertical wall and one of the outer walls, a plurality of agitators in the reactor compartment positioned to induce a continuous, unidirectional flow of reaction slurry, an inlet for introducing ground rock adjacent one side of the partial baffle, an inlet for sulfuric acid downstream from the inlet for ground rock, and a product withdrawal outlet adjacent the other side of the partial baffle.

---

This invention relates to the manufacture of phosphoric acid from phosphate rock and sulfuric acid. More particularly, the invention relates to the preparation of phosphoric acid in apparatus in which finely divided phosphate rock is attacked by sulfuric acid with resultant formation of calcium sulfate as a by-product.

As is well known in the art, the principal reaction involved in the manufacture of phosphoric acid by the wet process is the decomposition of the phosphatic material in the rock, which is present in the form of tricalcium phosphate, according to the following equation:

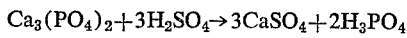

$$Ca_3(PO_4)_2 + 3H_2SO_4 \rightarrow 3CaSO_4 + 2H_3PO_4$$

Calcium sulfate can be precipitated in sulfuric acid in three forms, all of which are insoluble. In order to obtain a satisfactory yield of phosphoric acid, it has been found necessary to minimize both insoluble losses and soluble losses, and to precipitate calcium sulfate in a form which is easily filterable and washable.

The insoluble losses are mainly attributable to tricalcium phosphate in the rock which is not attacked by the sulfuric acid and by formation of dicalcium phosphate, $CaHPO_4 \cdot 2H_2O$, which is citrate soluble but insoluble in water. Failure to react all the tricalcium phosphate with the sulfuric acid can be minimized by sufficient retention time in the reactor and by avoiding a high concentration of sulfate ions on the surfaces of the rock which would coat the surfaces with gypsum, thereby preventing further contact of the surfaces with the sulfuric acid. Dicalcium phosphate is formed as an intermediate product, and it is in turn attacked by sulfuric acid to form phosphoric acid and gypsum if care is taken to avoid co-crystallization of gypsum with dicalcium phosphate which precipitates and consequently is removed from the reaction zone before the dicalcium phosphate has reacted with the sulfuric acid. This type of loss can be minimized by maintaining a slight excess of sulfate ions in the reaction zone.

The soluble losses result primarily from formation of calcium sulfate in a form which is not easily filterable and which occlude or otherwise retain soluble phosphate ions so that these cannot be readily washed from the calcium sulfate. Gypsum, which is the dihydrate form of calcium sulfate, has been found to exhibit the best filtration characteristics when produced in the form of large individual rhombic crystals. The relatively large crystals filter rapidly and occlude very little phosphoric acid or soluble phosphate ions. Hence minimum soluble losses are achieved by crystallizing gypsum in this form.

The design of prior art reactors or digestors has been dictated by the necessity of providing sufficient retention time to permit complete reaction of the sulfuric acid with the phosphate rock, by the necessity to avoid occurrence of high concentration of sulfuric acid at any stage in the reactor system and by the necessity to control temperature, ion concentration, and formation of crystal nuclei of gypsum so as to obtain gypsum in the form of large rhombic crystals. Sufficient retention time, control of sulfate ion distribution and avoidance of a high concentration either of sulfate ions or CaO ions (which would result in super-saturation and consequent undesirable formation of a large number of gypsum crystal nuclei) have been achieved in prior art reactors by providing inter alia a high rate of recirculation of unseparated reaction products, dilution of the sulfuric acid with phosphoric acid from the reaction system and premixing of the rock with violent agitation with unseparated reaction products before introduction into the reactor.

The earlier reactor systems developed to meet these requirements were in the form of multiple tank reactors which constituted a cyclic system. In these multiple tank reactors recirculation rates of as high as 20:1 were achieved. However, temperature control was difficult in such systems, and the need for even higher recirculation rates exceeded pump capacity. The extraction efficiency of such systems was thus relatively low. These and other mechanical problems led to the development of so-called single tank reactors.

United States Patent No. 2,950,171 issued August 23, 1960, to A. Macq; French Patent No. 1,315,397, issued to Dorr-Oliver, Incorporated, under date of February 16, 1962; and United States Patent No. 3,170,761, issued February 23, 1965, to S. M. Janikowski et al., are typical of these prior art so-called single tank reactors. The reactor tanks are of cylindrical shape, or may be elliptical or oval in horizontal cross-section. An inner annulus or draft tube is provided, with an impeller or agitator therein, either for withdrawal of reaction products or for introduction of ground phosphate rock. In addition, peripheral vertical baffles are provided at several points along the walls of the main reactor vessels which extend radially inwardly a relatively short distance. Other elements provided in one or more of these prior art reactors included radial baffles with openings of variable size for flow of reaction products therethrough.

These prior art single tank reactors, although of higher efficiency than multiple tank reactors, have the inherent disadvantages of complexity and are expensive to build and difficult to maintain. The inner annulus or draft pipes or tubes are of difficult construction and are prone to leakage problems, which are not detectable during operation.

If the inner annulus and radial baffles are made from metal, the corrosive effects of the strong acids cause attack or pitting and eventual leakage within a relatively short time. If carbon brick is used as a lining or facing, the problem of corrosion is overcome, but as many of the surfaces to be lined are convex, thin brick linings cannot be supported on them, and self-supporting linings are heavy, cumbersome and costly. These reactors thus suffer from a lack of versatility and difficulty in varying operating conditions if constructed of concrete with carbon brick lining.

In the Dorr-Oliver reactor, if a leak should develop between the inner annulus and the outer reactor, unreacted products would pass from the outer reactor into the inner annulus, thereby "short-circuiting" part of the reaction time and causing higher insoluble losses. Similar difficulties are inherent in the Janikowski design wherein a leak between the compartment in which the reactants are introduced and the draft tube would cause serious short-circuiting of the reaction slurry. Again it should be emphasized that such leaks could not be detected during operation until after it has been determined that the quality of the product is unsatisfactory and that the yield has dropped. There is thus a distinct need for a single tank reactor of high capacity which avoids the numerous disadvantages outlined above.

With the above difficulties in mind, it is a primary object of the present invention to provide a single tank reactor for the manufacture of phosphoric acid from phosphate rock and sulfuric acid with an extraction efficiency of greater than 97%, which is relatively simple in design and hence economical to fabricate, and which requires a minimum of maintenance and down time.

It is another object of the invention to provide a single tank reactor which eliminates an inner compartment or annulus surrounded by a reaction tank.

It is a further object of the instant invention to provide a versatile single tank reactor which can be made of metal but which in the event of corrosion will not result in short-circuiting of the reaction products.

It is another object of the invention to provide a single tank reactor which can be made of corrosion resistant materials but will still permit variation in operating conditions.

These and other objects of the invention which will be apparent to one skilled in the art upon reading these specifications are accomplished by that structure and arrangement of parts of which an exemplary embodiment will now be described. Reference is made to the accompanying drawings wherein.

Figure 1:
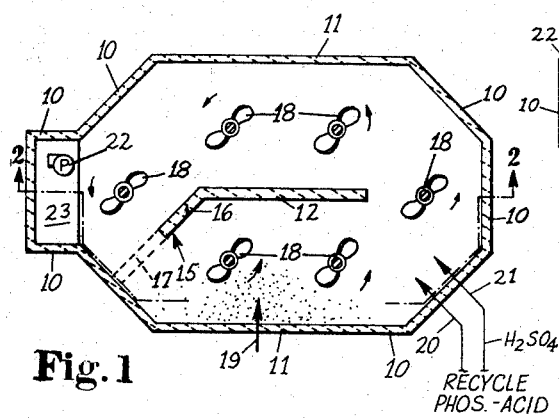
FIG. 1 is a schematic top plan view of one embodiment of a single tank reactor according to the present invention.
Figure 2:
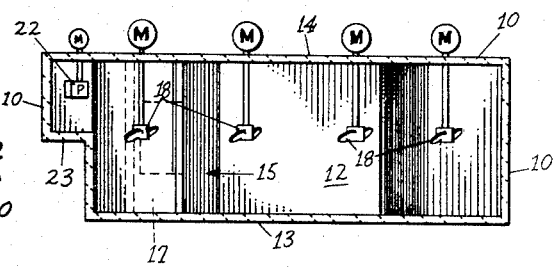
FIG. 2 is a sectional view taken on the line 2—2 of FIG. 1.

Referring to FIG. 1 of the drawings, the single tank reactor of the present invention has been shown as having a polygonal configuration in horizontal cross-section, but the configuration does not constitute a limitation upon the invention. Preferably the reactor tank of this embodiment, indicated generally at 10, will be composed of from six to ten planar wall sections which may be riveted or welded together. The number of wall sections and the configuration may vary depending upon the material and labor available at the site. Preferably two opposite walls, 11, will be of greater length than the remaining walls, as shown in FIG. 1, so that the reactor tank can be considered to have a longitudinal axis. Centrally disposed along the longitudinal axis of the tank is a vertical baffle 12 extending from the bottom 13 of the tank to the cover 14. Disposed at an oblique angle to the longitudinal baffle 12 is a partial baffle indicated generally at 15 which extends to a side wall of the reactor tank, preferably perpendicular thereto. As shown in FIGS. 1 and 2 the baffle 15 comprises a portion 16 adjacent the longitudinal baffle which extends the full height of the tank and another section 17 having an opening therein extending from a point substantially one-quarter to one-third of the height of the tank up to a point two-thirds to three-quarters of the height of the tank.

A plurality of agitators 18, of which six are shown by way of example in FIG. 1, are disposed around the interior of the tank approximately equidistant from one another and approximately intermediate the side walls of the tank and the longitudinal baffle.

As indicated in FIG. 1 of the drawing, when the agitators are operated to induce a counter-clockwise flow of material in the tank as viewed from above, ground phosphate rock is introduced into the tank at a point 19 adjacent the agitator closest to the "down-stream" side of the partial baffle 17. The ground phosphate rock is intermixed with the reaction products in the tank by the action of the agitator nearest the point of addition 19 and by the next succeeding agitator. Just beyond the next agitator recycled phosphoric acid from the reactor and sulfuric acid are introduced into the system at points 20 and 21 respectively. The rock and acid are circulated and intermixed by the action of the remaining agitators and the reaction products are drawn off by filter feed pump 22 disposed at the end of the tank remote from the point at which the sulfuric acid is introduced. The filter feed pump 22 is located in a stepped, off-set portion 23 of the reaction tank as best seen in FIG. 2, and hence withdraws the product from a point intermediate the top and bottom of the tank. This arrangement for withdrawal of the reaction products minimizes the possibility of entraining unreacted phosphate rock. The agitator adjacent the pump 22 and partial baffle section 17 imparts a counterclockwise whirling motion to the slurry which causes it to flow against the partial baffle section 17, while the agitator on the other side of the baffle creates a flow away from it. There is thus created a hydraulic gradient through the partial baffle 17, which cause the reaction products to be recirculated at a high rate, and intermixed with new rock and acid added in the feed section of the reactor.

Figure 3:
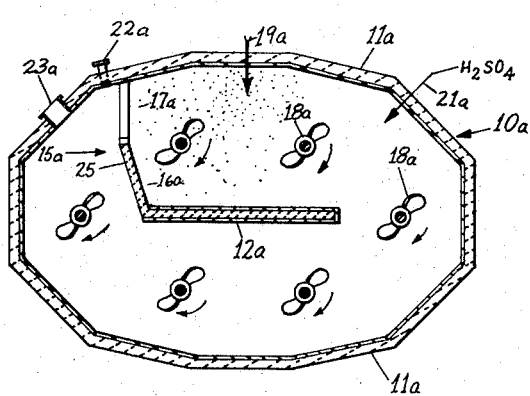
FIG. 3 is a top plan view of another embodiment of a single tank reactor with the top cover and parts mounted thereon removed.
Figure 4:
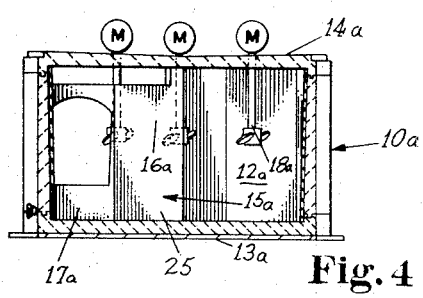
FIG. 4 is a side plan view of the reactor of FIG. 3.

In the embodiment of FIGS. 3 and 4 it will be noted that the reactor tank, indicated generally at 10a, is constructed of concrete with an inner lining of carbon brick. Instead of having sharply defined polygonal sides, the longer sides 11a merge in slightly arcuate configuration into the shorter side walls. This construction imparts greater strength to the reactor tank but at the same time makes the installation of the carbon brick lining more secure because of the keying action allowed by the arcuate configuration. The longitudinal baffle 12a is also of concrete and is faced on both sides with carbon brick. Alternatively, it can be built entirely of carbon brick. Since the circulation of the reaction products in the reactor tank is clockwise in the embodiments of FIGS. 3 and 4, the partial baffle, indicated generally at 15a, extends to the side wall of the reactor in such a manner that the ground rock point of addition 19a is on the downstream side of the partial baffle. Sulfuric acid is introduced into the system at point of addition 21a in the same manner as in the embodiment of FIGS. 1 and 2. Although not shown, recycled phosphoric acid may also be introduced at a point adjacent point 21a.

In the embodiment of FIGS. 3 and 4 the off-set portion from which the filter feed is withdrawn is eliminated. Instead, the filter feed is withdrawn directly from the bottom of the reactor from the outlet line 22a, or from the top through the overflow outlet 23a, on the opposite side of the partial baffle from the point of addition 19a.

The partial baffle 15a which is slightly less than the full height of the tank is constructed in such a manner that the opening in the section 17a can be enlarged in order to vary the operating conditions. To this end, the opening in section 17a is made wider than the designed requirement, and a portion of this opening may then be filled in with carbon brick only, without a concrete core, as indicated at 25 in FIG. 3. If operating requirements dictate, all or part of the carbon brick at 25 can readily be removed, thus widening the opening in section 17a without exposing the concrete core. The height of the opening in section 17a above the bottom can also be made adjustable, if an even broader adjustment is desired in the size of the opening and consequently in the recirculation flow.

Either embodiment can be constructed of metal, or of concrete lined with carbon brick. It will be apparent that if metal is used, even extreme corrosion and pitting resulting in holes or leaks in the longitudinal baffle 12 will not permit a short-circuiting of unreacted rock or sulfuric acid directly to the filter feed outlet. Instead, the reaction products leaking through the baffle would be subjected to the action of at least one agitator, thus providing additional reaction time before being withdrawn through the filter feed line.

The provision for variation in the size of the partial baffle section 17, 17a permits variation in the recirculation rate and in other operating conditions. It is also possible, due to the design of the present invention, to vary the size positioning, speed and pitch of any or all of the agitators so as to vary the recirculation rate. A change in the size, positioning and/or speed of the agitator at the rock input, or the agitator nearest the filter feed outlet ordinarily would have the most marked effect upon operating conditions. Consequently the present invention contemplates means, which are not shown since the means are conventional in the art, by which the positioning of these two agitators can be varied slightly, and means for changing the speed and/or pitch of the agitator blades, also not shown.

From the above description it will be apparent that there is provided a single tank reactor which can be designed for any desired capacity, which is less prone to leakage or other maintenance problems, which will not result in short-circuiting of reaction slurry in the event of undetected leaks and which structurally is extremely simple in comparison with prior art single tank reactors, but which nevertheless produces yields of phosphoric acid comparable to or better than that of the far more complex and expensive prior art reactors.

Figure 5:
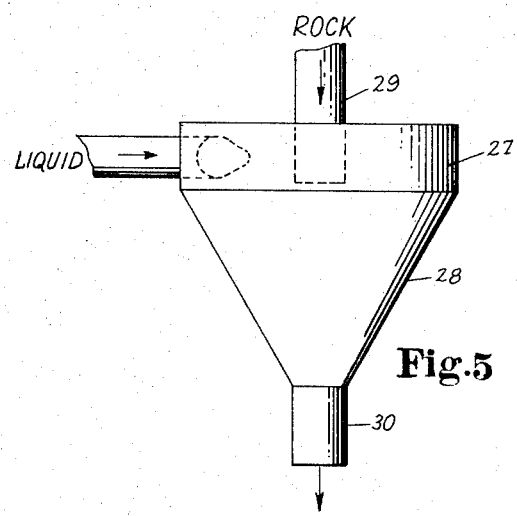
FIG. 5 is a schematic side view of a rock prewetter used in the present invention.

Although good results have been obtained with the apparatus illustrated in FIGURES 1–4 of the drawing, it is within the scope of the invention to utilize as optional equipment a device such as a cone type mixer which will prewet the phosphate rock quickly with the reaction product prior to the introduction thereof into the tank, shown in FIG. 5. In the cone type mixer, reaction product withdrawn from the tank or recycled diluted phosphoric acid returned from the filter station is introduced tangentially through the inlet 26 at the upper cylindrical section 27. This sets up a continuous helical flow of liquid downwardly along the conical sides 28. The ground rock is introduced through the top of the device through inlet 29 which is concentric with cylindrical section 27. The liquid vortex into which the ground rock drops by gravity causes efficient wetting of the rock, prevents agglomerates of unwetted rock particles from forming and avoids the entrainment of dust particles above the surface of the reaction products in the reactor tank. The wetted rock is discharged from the outlet 30 of the cone type mixer directly into the reactor at rock point of addition 19.

Figure 6:
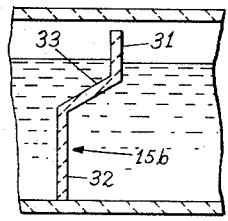
FIG. 6 is a fragmentary vertical sectional view of a modified partial baffle in the reactor of the invention.
Figure 7:
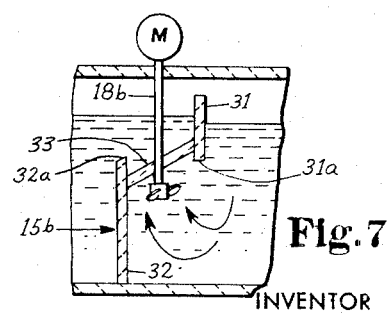
FIG. 7 is a fragmentary sectional view taken on a vertical plane through the middle of the partial baffle of FIG. 6.

A further modification is shown in FIGURES 6 and 7. In this embodiment the partial baffle, shown generally at 15b, is in the same relative position as partial baffle 15 in FIGURE 1. Partial baffle 15b is substantially full length from the bottom to the top of the reactor tank, but the upper portion 31 is offset with respect to the lower portion 32, (i.e. in different parallel vertical planes). The two portions 31 and 32 are joined at their peripheral edges by a sloping member 33 (see FIG. 6), except in the region equidistant between the baffle 12 and the outer wall 11 where there is an opening between the two portions 31 and 32 in which the propeller of a vertically disposed agitator 18b rotates as shown in FIG. 7. The upper edge 32a of the lower portion 32 is at a higher level than the lower edge 31a of the upper portion 31. The propeller is submerged in the reaction slurry and when rotated in such a manner as to cause reaction slurry to be drawn under the lower edge 31a of portion 31, the slurry is forced upwardly over the slightly higher edge 32a of portion 32. This results in a slightly higher hydrostatic head of reaction slurry on one side of portion 31, as illustrated in FIGS. 6 and 7, which causes a positive flow of slurry away from upper portion 31 at all times when the agitator is in operation. Since the amount of hydrostatic pressure can be controlled precisely by varying the speed of rotation of the propeller, this affords a precise way of controlling and varying the recirculation rate of the reaction slurry.

A sulfuric acid dilutor can be added as optional equipment if desired, although the introduction of recycled phosphoric acid just ahead of the sulfuric acid acts to dilute the sulfuric acids as it enters the tank and hence minimizes the likelihood of creating a high concentration of sulfate ions at this point.

EXAMPLE

A reactor according to FIGS. 3 and 4 has been constructed having a longitudinal axis of 48 feet, a width of 31 feet and a height of 16 feet 6 inches. The longitudinal baffle in this design is 20 feet in length. The lower edge of the opening in section 17a is 4 feet from the bottom of the tank, while the width of the opening is 6 feet 6 inches.

Commercial Western rock, ground to between 55% and 75% (preferably a minimum of 60%) passing a 200 mesh Tyler screen, has been treated in this reactor. The rock has the following average composition:

| | Percent |
|---|---|
| $P_2O_5$ | 31 to 32 |
| CaO | 46 to 47 |
| F | 3 to 3.4 |
| $R_2O_3$ | 2 to 2.5 | where R represents iron and aluminum.

30 to 40 tons per hour of ground rock have been digested with 24 to 32 tons per hour of sulfuric acid of 93% concentration. The operating temperature was between 165° and 175° F.' Large gypsum crystals, of uniform size, have been continuously produced, which filter and wash easily without the addition of any filter aid. A filtration rate of 0.37 to 0.40 tons per day of $P_2O_5$ as phosphoric acid (30% to 31% concentration calculated as $P_2O_5$) per square foot of filtering area has been achieved, with an over-all extraction efficiency consistently greater than 97%.

Higher capacities and/or efficiencies are obtainable with commercial grades of Florida and Morocco rocks, which are known to be considerably easier to treat than Western rock.

By contrast, most reactors or reaction systems of other design presently in operation, when handling Western rock of the same origin and composition, are known to require consistent use of filter aids in order to obtain filterable crystals, and even then the filtration rates and extraction efficiencies are known to be considerably lower than those obtained by the reactor of the instant invention. Thus, a further economic advantage of this invention is realized as a result of better over-all recoveries and elimination of the cost of filter aids.

Still another advantage of the present reactor, when operating with phosphate-containing rocks of higher reactivity, such as some of those of African origin, is to permit the use of a coarser rock feed, with consequent elimination of the capital investment required for grinding equipment. This can be done with only a nominal reduction in over-all recoveries, due to the high efficiency of the digestion and extraction stages.

It is believed that additional details of operation will be apparent to those skilled in the art. For example, conventional air coolers or vacuum coolers will be provided to maintain temperature control in view of the exothermic nature of the reaction. Similarly it is contemplated to provide means to exhaust gases from the liquid-free space in the top of the tank in conventional manner, and such means will preferably maintain a slight vacuum in this liquid-free space. Other expedients well known in the art may also be adopted, but are not described since they form no part of the present invention.

The embodiments of the invention in which an exclusive property or privilege is claimed are defined as follows:

1. Apparatus for continuous, high efficiency production of phosphoric acid from phosphate-containing rock and sulfuric acid consisting of a tank having substantially vertical outer walls defining a single compartment reaction and product withdrawal zone, a bottom and a cover, a substantially straight vertical wall disposed centrally in said tank in spaced apart relation to said outer walls, a partial baffle restricting the space between said centrally disposed wall and one of said outer walls, means for introducing said rock into said tank adjacent one side of said partial baffle, means for introducing said sulphuric acid into said tank to provide a reaction slurry, a plurality of spaced apart agitators in said tank inducing a continuous unidirectional flow of said reaction slurry around said centrally disposed wall, said partial baffle permitting continuous flow and recirculation of a portion of said reaction slurry, and means adjacent the other side of said partial baffle for withdrawing the reaction product from said tank, one of said agitators being positioned adjacent said means for introducing said phosphate rock.

2. The apparatus claimed in claim 1, wherein said tank is of non-cylindrical configuration, and wherein said centrally disposed wall is aligned with the longitudinal horizontal axis of said tank.

3. The apparatus claimed in claim 1, wherein said tank is polygonol, two opposite sides thereof being longer than the remaining sides, wherein said centrally disposed wall is parallel to said longer walls and wherein said partial baffle is substantially normal to one of said remaining walls.

4. The apparatus claimed in claim 1, wherein one of said agitators is positioned adjacent said other side of said partial baffle, said one agitator imparting a whirling flow of reaction slurry against said other side of said partial baffle so as to create turbulence and thorough intermixing of the reaction products and to cause said intermixed products to overflow said partial baffle and be recirculated.

5. The apparatus claimed in claim 3, wherein one of said remaining sides is offset and has an elevated bottom, said means for withdrawing the reaction products being connected to said elevated bottom.

6. The apparatus claimed in claim 1, wherein said agitators are adjustable in positioning, speed and pitch.

7. In apparatus for the continuous production of phosphoric acid from ground phosphate-containing rock and sulfuric acid, comprising a tank having outer walls defining a reaction zone, a bottom and a cover, means for introducing said rock into said tank, means for introducing said sulfuric acid into said tank to provide a reaction slurry, a plurality of spaced apart agitators in said tank inducing a continuous flow of said reaction slurry, and means for withdrawing the reaction products from said tank, the improvement which consists of a substantially straight vertical wall centrally disposed said tank in spaced apart relation to said outer walls, and a partial baffle restricting the space between said centrally disposed wall and one of said outer walls whereby to provide a one-compartment reaction and product withdrawal zone, said means for introducing said ground rock into said tank being positioned adjacent one side of said partial baffle, and said means for withdrawing said reaction products being positioned adjacent the other side of said partial baffle.

8. Apparatus according to claim 7, wherein said tank has a non-cylindrical configuration, and said centrally disposed wall is aligned with the horizontal longitudinal axis of said tank.

References Cited

UNITED STATES PATENTS

| 2,306,962 | 12/1942 | Kropp | 23—259.2 |
| 2,845,936 | 8/1958 | Boynton et al. | 23—285 |
| 3,170,761 | 2/1965 | Janikowski et al. | 23—165 |
| 3,181,931 | 5/1965 | Weber | 23—165 |

OSCAR R. VERTIZ, *Primary Examiner.*

A. GRIEF, *Assistant Examiner.*

U.S. Cl. X.R.

23—165